Jan. 11, 1966 KIYOMI MINOHARA 3,229,203
DIGITAL PHASE MEASURING APPARATUS UTILIZING
A COUNTER AS A DELAY MEANS
Filed May 24, 1961 7 Sheets-Sheet 2

INVENTOR
KIYOMI MINOHARA
BY
ATTORNEY

INVENTOR
KIYOMI MINOHARA

United States Patent Office 3,229,203
Patented Jan. 11, 1966

3,229,203
DIGITAL PHASE MEASURING APPARATUS UTILIZING A COUNTER AS A DELAY MEANS
Kiyomi Minohara, Tokyo-to, Japan, assignor to Furuno Denki Kabushiki Kaisha, Nagasaki-ken, Japan, a company of Japan
Filed May 24, 1961, Ser. No. 112,367
Claims priority, application Japan, May 25, 1960, 35/25,877
10 Claims. (Cl. 324—83)

The present invention relates to a system for precise measurement of the phase difference between two sets of pulse trains having the same frequency. Devices relating to such systems have been developed, the best-known type being used in the loran system. The purpose of the loran system is to measure, with precision of one microsecond or less, the phase difference between two sets of pulse trains repeated at several tens of cycles and the loran system enables the achievement of this end.

The means which has been in wide use in such systems and is considered as one of the best is the method whereby, in addition to the two sets of pulse trains to be measured, another set of pulse trains 1 and 2 are produced each of which is accurately synchronized with the pulse trains to be measured thereby enabling the measurement of the phase difference between pulse trains 1 and 2. In the loran system, by lowering the output of a crystal oscillator having a frequency of 100 kc., or more to a loran frequency by means of a plurality of frequency-dividing circuits connected in series, a pulse train 1, is obtained which is then synchronized precisely with the master pulse. At the same time a pulse train 2 having a loran frequency is produced based on the output of the aforesaid crystal oscillator which is synchronized with the slave pulse after which the phase difference between pulse trains 1 and 2 is measured. This method is well known and considered to be one of the best in the achievement of high precision measurement.

In a relatively early model of a loran instrument the output of each of the frequency dividing circuits which are provided to obtain pulse train 1 is phase-shifted by each of the phase-shifters, and by synthesizing these phase-shifted pulses, pulse train 2 is obtained. The adjustment of the phase difference of pulse train 2 with respect to pulse train 1 is accomplished by varying the phase shift of each phase shifter either manually or electrically and the required value of phase difference is obtained by reading the phase shift of each phase shifter and synthesizing each one. This method, however, presents a certain disadvantage in that considerable time was required for the adjustment of each individual phase shifter and further, that the adjustment operation was tedious.

In the improved loran devices, pulse train 1 is obtained by frequency-dividing the output of the crystal oscillator by means of a series of frequency-dividing circuits while pulse train 2 is obtained by frequency-dividing the output of aforesaid crystal oscillator by means of a second series of frequency-dividing circuits. A train of time signals are then fed to the counter circuit via the gate circuit which is opened by the pulse train 1 and closed by pulse train 2, and the number of time signals during the period when the gate circuit is open is counted and indicated, thus eliminating the necessity for manual or electrical operation of adjusting numerous phase-shifters required in the earlier model and enabling the attainment of speedier measurement. However, inasmuch as the frequency-dividing circuit and the counter circuit are essentially of identical construction, this type of device requires two sets of counter circuit rows for obtaining pulse trains 1 and 2 and another set of counter circuit row for counting time signals, with the result that three sets of counter circuit rows are required.

An object of the present invention is to enable one set of counter circuit rows to produce pulse train 2 and at the same time to count time signals, thus eliminating one set of counter circuit rows of the three sets used in the aforesaid measuring device of the improved type. The elimination of this step results in a device which is easy to manufacture at a substantially lower cost and of a size and weight which facilitates handling and shipping.

Another object of the present invention is to obtain easy and speedy measurement no less precise than that obtained in the improved loran device and eliminating the disadvantages pointed out above in connection with the earlier models of the loran device.

In order to attain this objective, in the instant invention the connection of the frequency-dividing circuit row 2 has been improved. The signals obtained from this are utilized for the production of pulse train 2 and at the same time the indicated counting value shows the phase difference between pulse trains 1 and 2.

In the present invention it will be observed that a high-frequency wave having a stable frequency is frequency-divided to a low-frequency wave by means of frequency-dividing circuit row 1, resulting in the production of pulse train 1. In addition, the high-frequency wave is subjected to the control of pulse train 1 and is fed, for a certain period during each pulse; i.e., a certain number of its pulses, to the frequency-dividing circuit row 2. The frequency-dividing circuit row 2 is connected in such a manner that it produces a pulse signal when the high-frequency pulses have reached a predetermined value and indicates its counting value shown at the point when the pulse signal was produced during the interval when its counting operation was arrested. These pulse signals are utilized directly as pulse train 2, or may be used for producing pulse train 2. Consequently, the value indicated during the stop period of the frequency-dividing circuit row 2 corresponds to the phase difference between pulse trains 1 and 2.

A further object of the invention is the provision of means whereby the period during which the high-frequency wave is fed to the frequency-dividing circuit row 2 is to be maintained constant at all times even when the frequency of pulse train 1 is changed in response to the change in the frequency of the pulse train to be measured. This is achieved by means of a comparatively simple circuit construction wherein the aforesaid high-frequency feeding period is arrested at the completion or in the middle of one interval of pulse train 1 pulse and is started at a predetermined unit time to move back from the terminating time. For example, in the case of a loran receiver it is essential that the period of pulse 1 be capable of being switched to about 30 milliseconds, or 40 milliseconds or 50 milliseconds. This is achieved by frequency-dividing a stable high-frequency one by one which results in the attainment of a pulse train having a period of 5 milliseconds. This is further frequency-divided by means of a three-stage frequency-dividing circuit operating feedback from the back stage to the front stage. By switching this feedback condition, the aforesaid switching of periods into the three time unit intervals is attained. When this method is applied in the process wherein the pulse train having a period of 5 milliseconds shifts to pulse train 1 having a loran frequency, a square wave pulse of exactly 10 milliseconds duration appears at each point retracted from the middle and terminal point of one period of pulse 1, independent of the aforesaid switching of loran periods into three kinds and the minute loran period changes in each kind. In other words, the half-periods of pulse 1 are of three types; i.e., about 15 milliseconds, about 20 milliseconds and about 25 milliseconds. In all cases, however, the 10 milliseconds of the rear portion is unchanged, and only the front portion is changed into about 5 milliseconds, about 10 milliseconds and about 15 milliseconds. Namely, one of the important features of the present invention when applied to a loran receiver is that a period of 10 milliseconds which is moved back or retracted from the middle or terminal point of pulse 1, is utilized for feeding a high-frequency wave to the frequency-dividing circuit row 2.

Another important feature of the instant invention is that the time position of a point where one portion of the pulse trains to be measured and synchronized with pulse train 1 need not be near or in the vicinity of the initial point of a period of pulse 1.

In the conventional loran receiving system, the master pulse, which is the one part of the pulses to be measured, is synchronized with the vicinity of the front edge of a period of pulse 1, and the slave pulse, which is the other part of the pulses to be measured, is made to appear during the latter half of a period of the pulse 1. In the loran receiver embodying the present invention, however, the master pulse is synchronized with the vicinity of the position 10 milliseconds prior to the final point of a half period of pulse 1, and the slave pulse appears during a period which ends at the final point of the other half-period neighboring the aforesaid half-period and starts at a time 10 milliseconds prior thereto. When compared with a case wherein the master pulse appears in the vicinity of the starting point of the time axis as in the conventional loran receiver, it will become obvious that one advantage to be gained by this method is the ease of monitoring the synchronizing condition in cases where the half-periods of the pulse train 1 are indicated on one time axis on a cathode-ray tube as in the conventional loran receiver, since the master pulse appears in the vicinity of the middle of the time axis.

In instances where the phase difference is to be indicated with a precision within 1 microsecond as required in the loran receiver, the present invention utilizes a high-frequency wave of over 1 mc., and, by feeding this without altering its frequency and phase to the frequency-dividing circuit rows 1 and 2, it is possible to have the phase difference indicated perfectly on the digital computer. However, in cases where a frequency of less than 1 mc., 100 kc. for example, is used as a high-frequency wave, as in the ordinary loran receiver, the high-frequency wave is fed to the frequency-dividing circuit row 2 via a variable phase shifter. In the latter case, intervals of more than 10 microseconds are read from the indication given by the frequency-dividing circuit row 2, while intervals of less than 10 microseconds are read by the quantities adjusted by the variable phase shifter.

Still another purpose of the instant invention is that in the case where a variable phase shifter is used, its adjusted quantities and the value indicated by the frequency-dividing circuit row 2 can be related so that the value of measurement obtained by synthesizing both becomes a correct value at all times. For this purpose, in the present invention, a cam is provided on the rotary axle of the variable phase shifter, and each time the aforesaid rotary axle rotates at a certain angle, a switch is operated by the control of the aforesaid cam. It is so constructed that the number of the high-frequency pulses to be fed in the frequency-dividing circuit row 2 is increased or decreased by the number corresponding to the aforesaid certain angle. In the most simple example of the cases where those of more than 10 microseconds are read by the value indicated by the frequency-dividing circuit row 2 by the use of a high-frequency wave of 100 kc. and those of less than 10 microseconds are read by the quantities adjusted by the variable phase shifter as described above, a variable phase shifter which produces a delay of 10 microseconds per rotation is used, and the number of the high-frequency pulses of 100 kc. to be fed to the frequency-dividing circuit row 2 is increased or decreased by 1 for each rotation of the variable phase shifter.

Further, in this invention, in order to modify the number of the high-frequency waves to be fed to the frequency-dividing circuit row 2 in reference to the quantities adjusted by the variable phase shifter, the period during which the high-frequency wave is fed to the frequency-dividing row 2 is adjusted. This period of feeding the high-frequency wave is regulated by the control of the pulse train 1. But, when the switch is operated by the rotation of the variable phase shifter, the aforesaid period is increased or decreased for a time corresponding to an angle necessary for the operation of the switch. Namely, as described above, in the case where it is intended that one rotation of the variable phase shifter is to correspond to 10 microseconds and that the number of high-frequency pulses to be fed to the frequency-dividing circuit row 2 for each rotation of the variable phase shifter is to be increased or decreased by 1, the period of feeding the high-frequency wave for each rotation of the variable phase shifter is increased or decreased by 10 microseconds.

Further objects and advantages of the instant invention will become more apparent from the following drawings and accompanying description.

Figure 1:
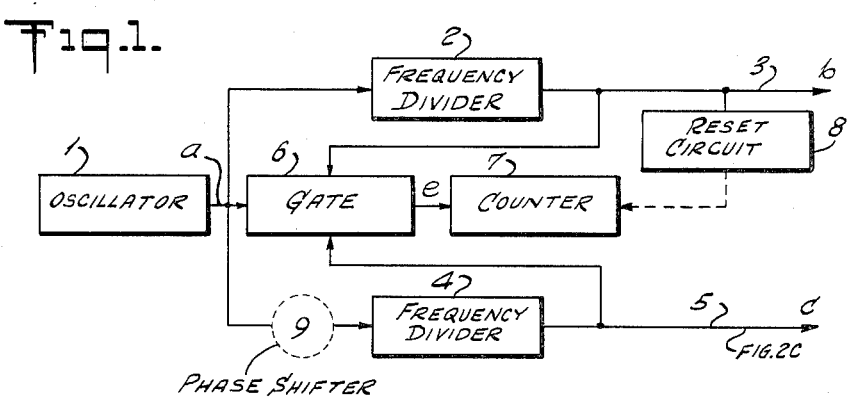
FIG. 1 is a block diagram showing an example of conventional phase difference measuring device.
Figure 2:
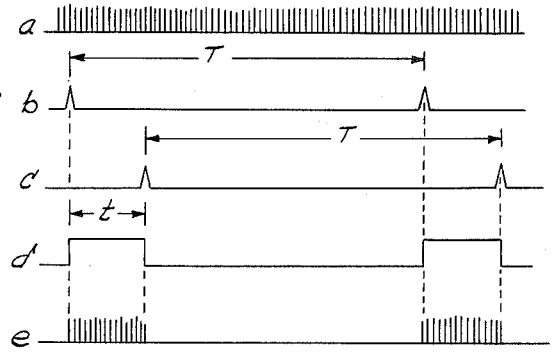
FIG. 2 is a waveform diagram explaining the operation of the device of FIG. 1.

As shown in FIG. 1, in the phase difference measuring portion of a conventional, fairly new type loran receiver, a high-frequency wave of about 100 kc. for example, as shown in FIG. 2a, is produced by means of the crystal oscillator 1 which is lowered in frequency by means of a first frequency-dividing circuit 2, whereby a No. 1 pulse train having a period T as illustrated in FIG. 2b is produced on the line 3. In addition, the aforesaid high-frequency wave is lowered in frequency by a second frequency-dividing circuit 4 whereby a No. 2 pulse train having a period T as shown in FIG. 2c, is produced on the line 5 and, as indicated in FIG. 2d, the gate circuit 6 is controlled by No. 1 pulse train and No. 2 pulse train and thereby it is opened for a time $t$ corresponding to the phase difference between the two pulse trains. Then, as shown by FIG. 2e, for the period during which the gate circuit 6 is opened, the aforesaid high-frequency wave is fed to the counter circuit 7 and the number of pulses of the aforesaid high-frequency wave fed during the time $t$ is counted and indicated and thereby the phase difference is obtained. The value indicated on the counter circuit 7 is maintained just as it is for some time and then is reset by means of the reset circuit 8, which is subject to the control of No. 1 pulse train, immediately before the gate circuit 6 reopens. Consequently, in a case where, for instance, 100 kc. is used as a high-frequency wave in such device, it is possible to have the phase difference indicated with a precision of 10 microseconds. And, in the case where a measurement for less than 10 microseconds is to be made with such device, the phase shifter 9 is placed ahead of frequency-dividing circuit 4 and by its operation the phase shift of No. 2 pulse train is adjusted in a range of less than 10 microseconds, and by the quantities of change in the phase shifter it is possible to obtain a fraction of the phase difference below 10 microseconds.

The device shown in FIG. 1 has advantages in that its measuring operation is simple and that its measuring precision is excellent. However, its structure is unavoidably complicated because it requires frequency-dividing circuit 2, frequency-dividing circuit 4 and the counter circuit 7, all of which are essentially similar devices.

Figure 3:
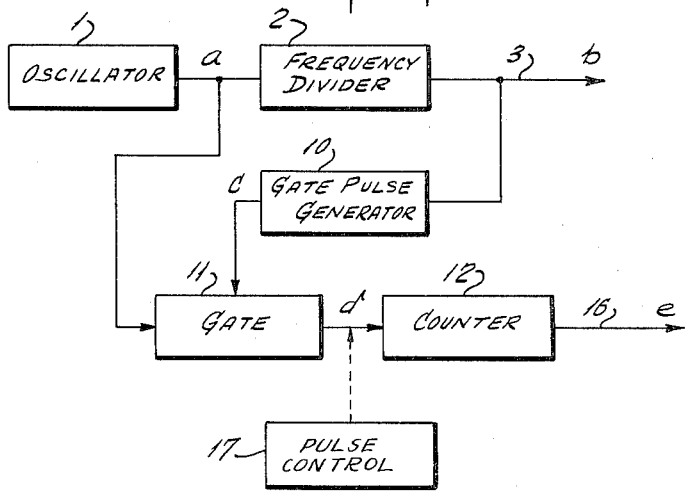
FIG. 3 is a block diagram showing an example of phase difference measuring device applying the present invention.
Figure 6:
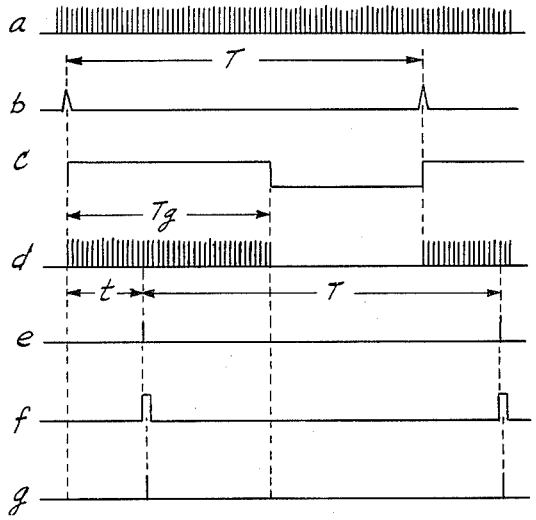
FIG. 6 is a waveform diagram explaining the operation of the devices shown in FIGS. 3 and 5.

As shown in FIG. 3, apparatus in accordance with the invention utilizes an oscillator 1 to produce a high-frequency wave as shown in FIG. 6a, for example. This frequency is lowered by means of frequency-dividing circuit 2 whereupon No. 1 pulse train having a period T, as shown in FIG. 6b, is produced on the line 3, and on the basis of No. 1 pulse train, a gate pulse as in FIG. 6c, having a certain duration Tg is produced by means of the gate-pulse generating circuit 10 and a certain number of high-frequency pulses, as FIG. 6d, are fed to the counter circuit 12 via the gate circuit 11, which is opened for the duration of the aforesaid gate pulse.

Figure 4:
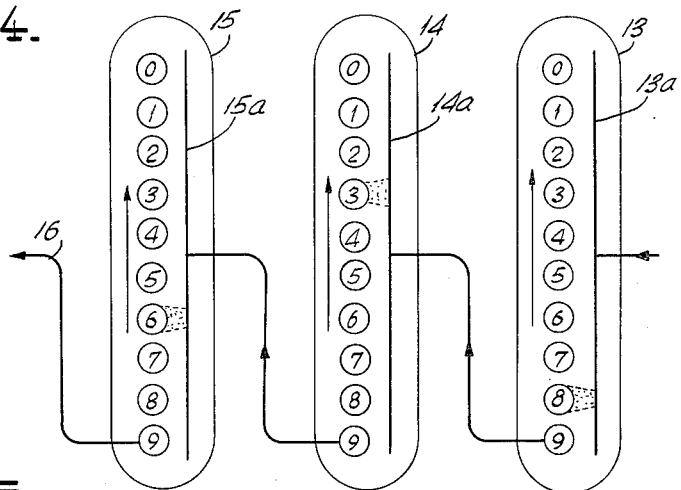
FIG. 4 is the connection diagram of the counter circuit of FIG. 3.

The counter circuit 12 has decimal counting elements 13, 14 and 15, as shown in FIG. 4. In each of the counting elements or discharge tubes the ten circles represent counter electrodes and the figures in the circles are the values to be indicated by the electrodes. The specific circuitry has not been shown in order to avoid unnecessary complication. The decimal counting elements may take any desired form. The decatron discharge tube has been found to be most satisfactory though it is evident that other types of counting tubes may also be used. Each counting element is so connected that each time a signal to be counted arrives, the value to be indicated is decreased by 1 as, for instance, "3," "2," "1," "0," "9," "8," etc. In the example shown in the drawing, the arriving signals are fed to the input electrode 13a of the lowest-place counting element 13. Its electrode "9" is connected to the input electrode 14a of the higher-place counting element 14. The electrode "9" of the counting element 14 is connected to the input electrode 15a of the highest-place counting element 15. The electrode "9" of the counting element 15 is connected to the output line 16.

In the counter circuit described above, assume the value indicated on the counting element 13 before the counting operation to be "8," that on the counting element 14 to be "3" and that on the counting element 15 to be "6," then, this condition represents a numerical value of "638." Now, the operation of each counting element will be examined. In the counting element 13, when "9" pieces of signals arrive at the input electrode 13a the value indicates changes from "0" to "9," an output is produced at the electrode "9"; and next, each time "10" pieces of signals arrive, an output is produced at the electrode "9." In the counting element 14, when "4" pieces of signals arrive at the input electrode 14a, an output is produced at the electrode "9"; and next, each time another "10" pieces of signals arrive, an output is produced at the electrode "9." In the counting element 15, when "7" pieces of signals arrive at the input electrode 15a, an output is produced from the electrode "9" onto the line 16. Thus, when "639" pieces of signals arrive at the input electrode of the counting element 13, an output appears on the line 16; and the number of input signals at this time is larger by 1. And, when "1000" pieces of input signals arrive, its indicated value returns to "638," which is the same as its initial value. Such difference of "1" between the number of incoming signals and the indicated value is adjusted by some other means.

It is also to be understood that the impulse produced when there is a value change from "0" to "9" such impulse will appear at electrode "9" and will produce an output signal in the manner to be described hereinafter.

Again, in FIG. 3, the duration Tg of the gate pulse, as in FIG. 6c is produced by the gate pulse generating circuit and is so determined that it will pass as many high-frequency pulses as will enable the counting value indicated on the counter circuit 12 to complete a cycle and return to its initial value. Consequently, as shown by FIG. 6e, No. 2 pulse train, which is constantly delayed from No. 1 pulse train by a time $t$, is fed to the line 16 the value indicated by the counting circuit 12 at this time is T–1. For example, assume the high-frequency wave of the oscillator 1 to be 100 kc., the duration Tg of the gate pulse to be 10 milliseconds, and the counter circuit 12 to be of the same construction as that in FIG. 4; then, "1000" pieces of high-frequency pulses are fed to the counter circuit 12 for each period of No. 1 pulse train so that the counter circuit 12 will indicate the same value constantly during its stop period; and thereby it is possible to read directly the phase difference of No. 2 pulse train with respect to No. 1 pulse train in units of 10 microseconds. Namely, in this example, when it is assumed that the value indicated on the counter circuit 12 is "638" as above, then a No. 2 pulse train is produced with a delay of 6390 microseconds from No. 1 pulse train.

It is not convenient in practice to have a difference between the indicated time value and the actual phase difference. To avoid this difficulty compensation can be effected by advancing the time of both the initial point and the final point of the gate wave shown in FIG. 6c by one cycle of the high frequency to be counted. The advancement of the initial and final points of the gate wave shown in FIG. 6c by 10 microseconds so that the value 638 indicated by the counter circuit 12 will correctly correspond to 6380 microseconds, the phase difference between the first and second pulse trains.

To adjust the phase difference of No. 2 pulse train so produced, the adjusting circuit 17 is provided. The adjusting circuit 17 is to decrease or increase the number of high-frequency pulses to be fed to the counter circuit 12 at a proper time; and when it increases the number of pulses, the value indicated on the counter circuit is decreased that much so that the phase difference $t$ decreases. Inversely, when it decreases the number, the value indicated on the counter circuit increases enough so that the phase difference $t$ increases. For example, when the high-frequency wave is assumed to be 100 kc., as in the above case, then, by feeding one extra pulse at a proper time, the phase of No. 2 pulse train is advanced by 10 microseconds. Again, when the pulses to be fed at a proper time are decreased to 999 by one less, then the phase of No. 2 pulse train is delayed by 10 microseconds.

Figure 5:
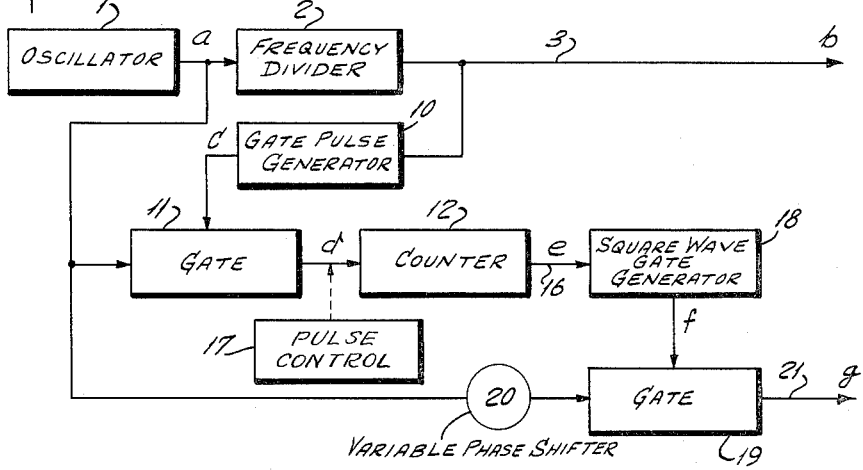
FIG. 5 is a block diagram illustrating another example of the phase difference measuring device embodying the present invention.

FIG. 5 shows a device for adjusting the phase of No. 2 pulse train with a precision more minute than one period of the standard high-frequency wave. Gate circuit 18 produces a square wave, as FIG. 6f, which is triggered by the output of the counter circuit 12 as in FIG. 6e, and which has a width almost the same as one period of the high-frequency wave produced by the oscillator 1. By this means, the gate circuit 19 is opened for the duration of the aforesaid square wave. A variable phase shifter 20 is then used to adjust the high-frquency wave of the oscillator 1 within a range of its one period. Of the phase-shifted high frequency, one cycle of which is in the period during which the gate circuit 19 is opened is fed to the line 21, as shown in FIG. 6g. This wave is utilized as No. 2 pulse train. Consequently, it is possible to adjust the phase of No. 2 pulse train with an extremely high precision; and an approximate value of its phase difference with respect to No. 1 pulse train is read by the indication on the counter circuit No. 12, and its fraction is read by the quantities adjusted by the variable phase shifter 20.

Figure 7:
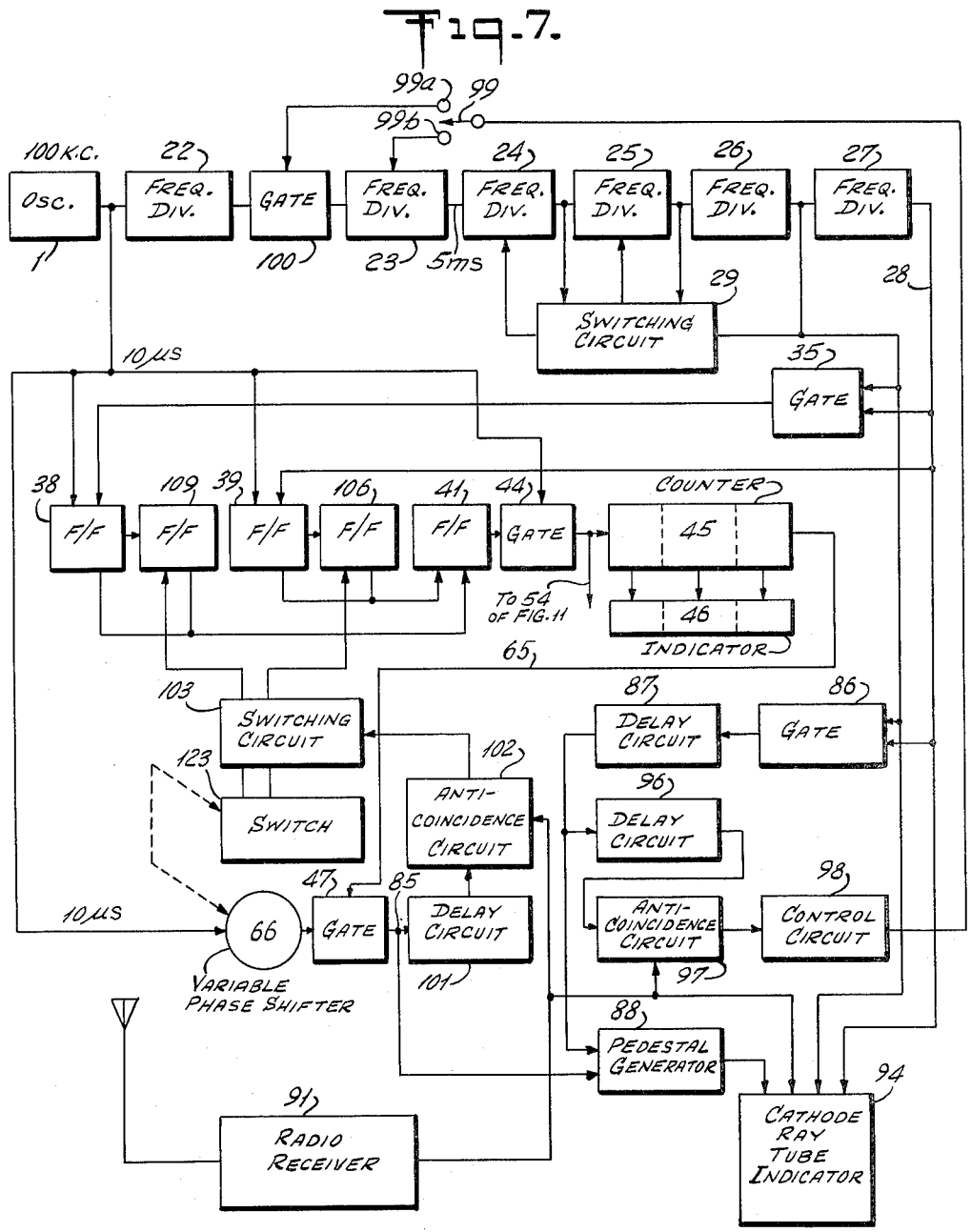
FIG. 7 is a block diagram showing a loran receiver embodying the present invention.

FIG. 7 shows a concrete structure of the loran receiver operated under the basic construction shown in FIG. 5. The high-frequency wave of 100 kc. produced by the high-frequency oscillator 1 is lowered to 200 cycles by means of the frequency dividers 22 and 23 and further to the loran period by means of the ½-frequency dividers 24 through 27 so that it becomes a fundamental square wave and is fed to the line 28. Since the loran periods are specified in three kinds—H group of about 30 milli-seconds, L group of about 40 milliseconds and S group of about 50 milliseconds, it is necessary to operate these switchings properly. For this purpose, the switching circuit 29 is provided, which switches the connection and feedback condition between the frequency dividers 24 through 26.

Figure 8:
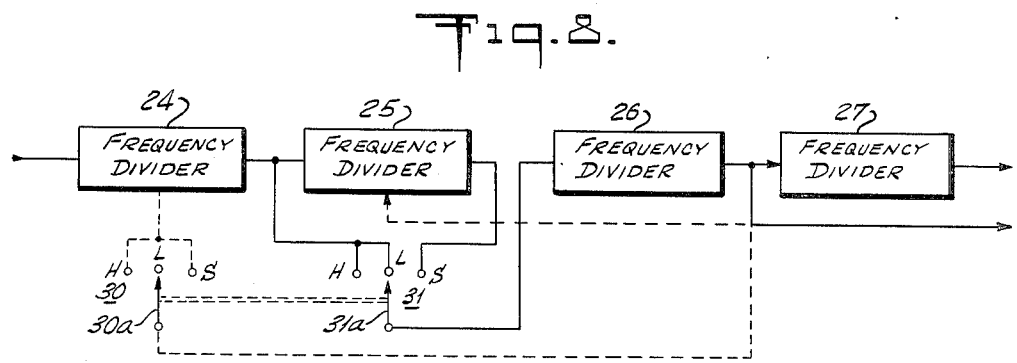
FIG. 8 is a diagram showing the connection of the wave-period switching part of FIG. 7.

As shown in FIG. 8, the switching circuit 29 has three contact points H, L and S and is provided with the interlocked switches 30 and 31. The output side of the frequency divider 26 is fed back to the input side of the frequency divider 25 and at the same time is connected to the movable arm 30a of the switch 30. The contact points H and S of the switch 30 are connected to the input side of the frequency divider 24. The output side of the frequency divider 25 is connected to the contact point S of the switch 31. The movable arm 31a of the switch 31 is connected to the input side of the frequency divider 26.

Figure 9:
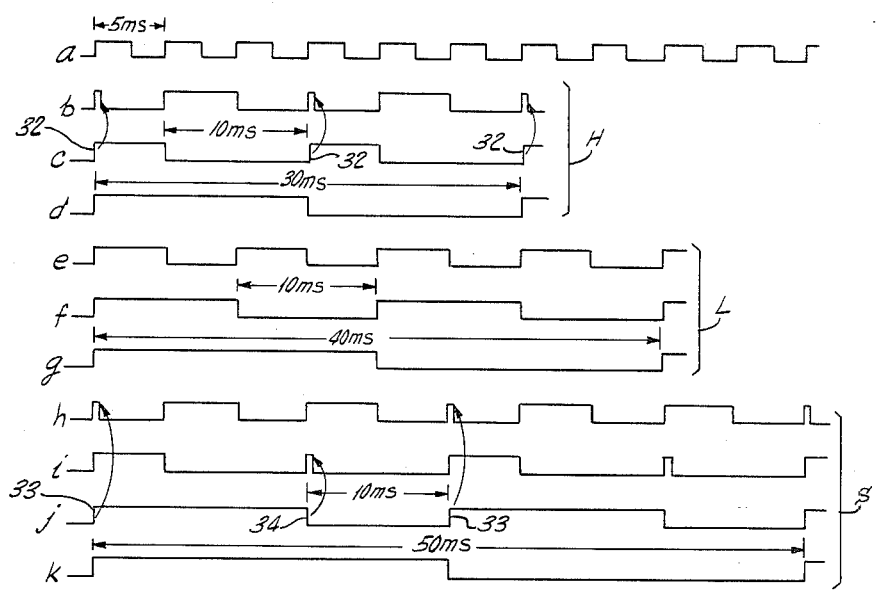
FIG. 9 is a waveform diagram explaining the operation of the part shown in FIG. 8.

Now, assume that the movable arms 30a and 31a of the switches 30 and 31 are in contact with the contact point H; then, a square wave, as shown in FIG. 9a, having a period of 5 milliseconds is frequency divided by means of the frequency dividers 24, 26 and 27. But, since the rise time portion 32 (FIG. 9c) of the output square wave of the frequency divider 26 is fed back to the frequency divider 24, the output waveforms of the frequency dividers 24, 26 and 27 of FIGS. 7 and 8 are as illustrated in FIGS. 9b, 9c and 9d, and a fundamental square wave having a period of 30 milliseconds, as in FIG. 9d, is fed to the output line 28 of FIG. 7.

Next, assume that the movable arms 30a and 31a of the switches 30 and 31 as shown in FIG. 8 are in contact with the contact point L; then, a square wave as in FIG. 9a, having a period of 5 milliseconds is frequency-divided by the frequency dividers 24, 26 and 27 of FIGS. 7 and 8, and the output waveforms of these frequency dividers take the form shown in FIGS. 9e, 9f and 9g and a fundamental square wave having a period of 40 milliseconds, as in FIG. 9g, is sent to the output line 28 of FIG. 7.

Again, assume that the movable arms 30a and 31a of the switches 30 and 31 are in contact with the contact point S; then, a square wave, as in FIG. 9a, having a period of 5 milliseconds is subject to the frequency-division by the frequency dividers 24, 25, 26 and 27. However, since the rise time portion 33 (FIG. 9j) of the input square wave of the frequency divider 26 is fed back to the frequency divider 24, and the downward portion 34 (FIG. 9j) of the output square wave of the frequency divider 26 is fed back to the frequency divider 25; the output waveforms of the frequency dividers 24, 25, 26 and 27 become respectively, like FIGS. 9h, i, j, and k and a fundamental square wave, as in FIG. 9k having a period of 50 milliseconds is fed to the output line 28 of FIG. 7.

When the period of the fundamental square wave is switched by the switches 30 and 31 (FIG. 8) correspond to the loran period, the output waveform of the frequency divider 26 undergoes a change in the length of the front-half or first portion of its period, but the length of its back-half or second portion remains at a fixed value of 10 milliseconds as illustrated in FIGS. 9c, f and j, regardless of the period in which the fundamental square wave is switched. Consequently, as will be explained later, this second portion having a length of 10 milliseconds is utilized for the production of No. 2 pulse train.

Figure 10:
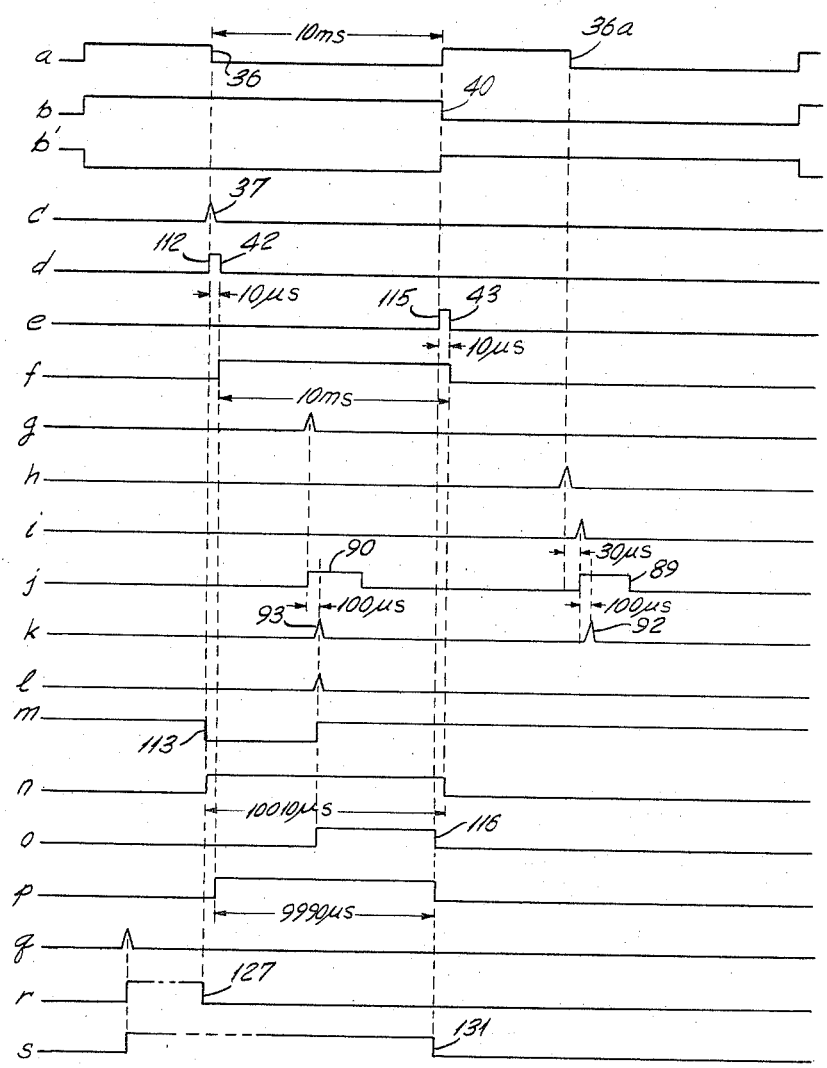
FIG. 10 is a waveform diagram explaining the operation of each portion of the devices shown in FIG. 7.

As shown in FIG. 7, such output of the frequency divider 26 as this is led to the gate circuit 35, which is controlled by the fundamental square wave on the line 28. FIG. 10a represents the output of the frequency divider 26 and corresponds to either one of c, f or j of FIG. 9. FIG. 10b is the fundamental square wave corresponding to either one of d, g or k of FIG. 9. Consequently, the gate circuit 35 responds to the leading edges 36 and 36a of the 10 millisecond output pulses of the frequency divider 26 (FIG. 10a), and then only those pulses 37 in the positive sections of the fundamental square wave, as shown in FIG. 10b and appearing on the line 28 are selected. The selected pulses 37 are illustrated in FIG. 10c. This pulse, together with the high-frequency wave of the oscillator 1, is fed to the flip-flop circuit 38. The aforesaid flip-flop circuit 38 is switched by the pulse 37 and is restored by the subsequently arriving high-frequency wave of the oscillator 1. As a result, a square wave, as FIG. 10d is produced. In this case, since the fundamental square wave has been obtained by frequency-dividing the high-frequency wave of the oscillator 1 and its phase coincides exactly with one wave of the aforesaid high frequency, the width of the short square wave, as FIG. 10d, becomes exactly 10 microseconds, corresponding to one period of the aforesaid high-frequency wave. It will also be observed that the fundamental square wave on the line 28 and the high-frequency wave of the oscillator 1 are fed to the flip-flop circuit 39. The aforesaid flip-flop circuit 39 is switched by the downward portion 40 of the fundamental square wave shown in FIG. 10b and is restored by the subsequently arriving high-frequency wave of oscillator 1. As a result, a short square wave, as in FIG. 10e, is produced. In this case, since the fundamental square wave has been obtained by frequency-dividing the high-frequency wave of the oscillator 1 and the phase of its downward portion 40 coincides with one wave of the aforesaid high frequency. the width of the short square wave of FIG. 10e becomes exactly 10 microseconds. The output square waves of these flip-flop circuits 38 and 39 are fed to the flip-flop circuit 41. The above flip-flop circuit 41 is switched by means of the downward portion 42 of the short square wave, as in FIG. 10d, and then it is restored by means of the downward portion 43 of the short square wave as in FIG. 10e, whereby a square wave as in FIG. 10f is produced. When such square wave as in FIG. 10e is compared with the 10 millisecond section of FIG. 10a, both of its initial and final edges are delayed exactly by 10 microseconds so that its width becomes exactly 10 milliseconds.

This square wave having a width of 10 milliseconds is fed to the gate circuit 44 and controls the passage of the high-frequency wave of the oscillator 1 at the aforesaid gate circuit. As a result, 1000 pieces of high-frequency pulses are fed to the counter circuit 45; the counting value during the cutoff period of the counter circuit 45 is indicated by the indicator circuit 46; and the output, as in FIG. 6e of the counter circuit 45 is fed to the gate circuit 47.

Figure 11:
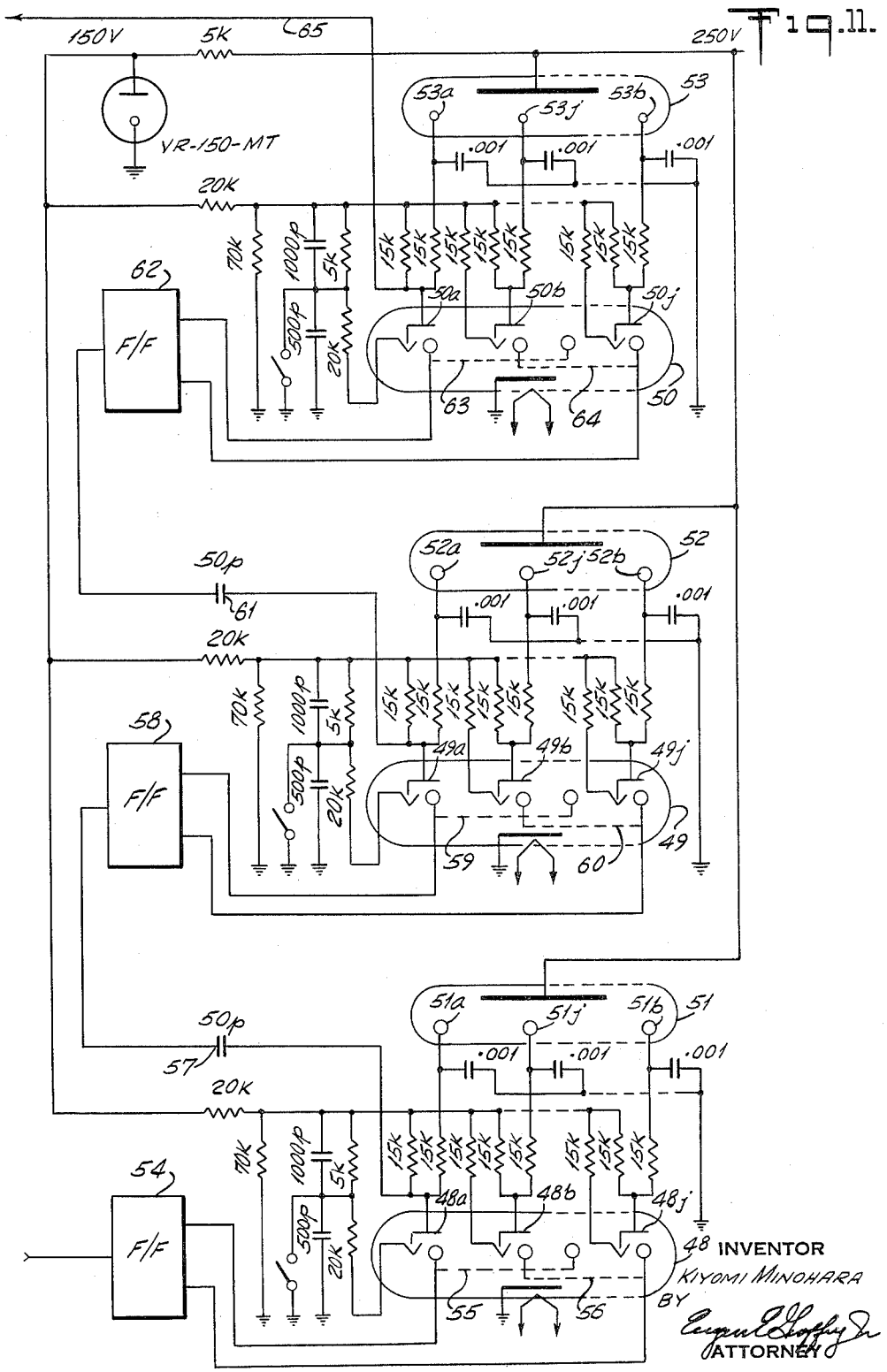
FIG. 11 is the detailed connection diagram of the counter circuit of FIG. 7.

FIG. 11 shows the electrical connection of the counter circuit 45 and the indicator circuit 46, where three beam switching tubes 48, 49 and 50 and three indicator discharge tubes 51, 52 and 53 are used. In the application of the present invention, No. "0" target 48a of the beam switching tube 48 is connected to No. "0" discharge tube electrode 51a of the indicator discharge tube 51; Nos. "1" through "9" targets, 48b, 48c . . . 48j are connected respectively to Nos. "9" through "1" discharge tube electrodes, 51j, 51i . . . 51c, 51b; and other beam switching tubes 49 and 50 are connected to the indicator discharge tubes 52 and 53, respectively, in a similar manner.

The aforesaid 100 kc. high-frequency wave which has passed the gate circuit 44 (FIG. 7) is made to pass the flip-flop circuit 54 (FIG. 11) and thereby it is fed alternately to the even-number grid 55 and the odd-number grid 56 of the beam switching tube 48. As a result, the discharges at the targets of both tubes shift in order of 48a, 48b, 48c . . . 48j; and the values indicated on the indicator discharge tube 51 change in order of "0" "9," "0" . . . "1." And, when the discharge at the beam switching tube 48 shifts from the target 48a to the target 48b, its impulse is fed to the flip-flop circuit 58 via the coupling condenser 57; and the output of the aforesaid flip-flop circuit 58 is fed to the even-number grid 59 and the odd-number grid 60 of the beam switching tube 49, alternately. The beam switching tube 49 operates in the same way as 48. When the discharge shifts from the target 49a to 49b, the impulse is fed to the flip-flop circuit 62 via the coupling condenser 61; and the output of the flip-flop circuit 62 is fed to the even-number grid 63 and the odd-number grid 64 of the beam switching tube 50, alternatively. The beam switching tube 50 operates in the same way as 48 and 49. When the discharge shifts from the target 50a to 50b, the impulse is fed to the gate circuit 47 via the line 65. This impulse corresponds to the pulse shown by FIG. 6e.

Referring now to FIGURE 7, the phase of the 100 kc. high frequency wave of the oscillator 1 is adjusted by means of the variable phase shifter 66 within a range of 10 microseconds, corresponding to its one period and is fed to the gate circuit 47. The gate circuit 47 is triggered by a pulse such as FIG. 6f, which has been sent by the line 65, and it opens the gate for about 10 microseconds, during which time only one wave of the high frequency which has been sent from the variable phase shifter 66 is passed as a No. 2 pulse train, as shown in FIG. 6g. The wave shown in FIG. 10g is the same as that of FIG. 6g.

Figure 12:
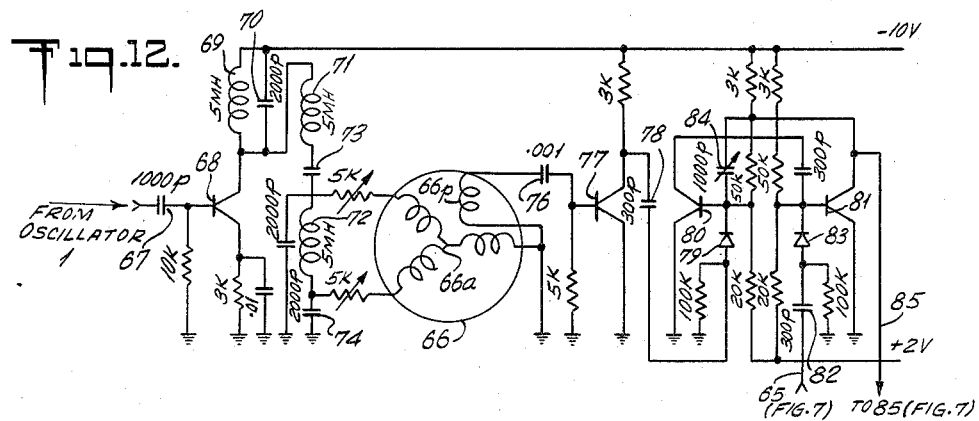
FIG. 12 is a detailed connection diagram of the variable phase shifter and the gate circuit 65 of FIG. 7.

FIG. 12 shows the connection of the variable phase shifter 66 and the gate circuit 47. The high-frequency wave from the oscillator 1 is fed to the base of the transistor 68 via the coupling condenser 67. Its amplified output appears at a resonance circuit consisting of the coil 69 on the collector side and the condenser 70, and it is changed into a three-phase alternating current by means of a circuit network consisting of the coils 71 and 72 and the condensers 73, 74 and 75 and is fed to the primary winding 66a of the variable phase shifter 66. The phase-shifted high-frequency wave which appears on the secondary winding of the variable phase shifter 66 is amplified by the transistor 77 via the coupling condenser 76 and is fed to the base of the transistor 80 via the coupling condenser 78 and the rectifier 79. The transistor 80 together with the transistor 81 forms a one-shot multivibrator circuit which is to be switched by a pulse fed from the counter circuit 45 to the base of the transistor 81 via the line 65, the coupling condenser 82 and the rectifiers 83, and which is to be restored after about 10 microseconds. This restoration time is adjusted by the operation of the variable condenser 84, which is coupled with the base of the transistor 80 and the collector of the transistor 81. As a result, only one wave of the high frequency which has arrived during the switching time of the aforesaid one-shot multivibrator is sent out as No. 2 pulse train, as in FIG. 6g or FIG. 10g, from the collector of the transistor 81 to the line 85.

The square wave, as in FIG. 10a of the frequency divider 26 (FIG. 7) is fed to the gate circuit 86, which is subject to the control of a fundamental square wave of opposite polarity, as in FIG. 10b', on the output line 28. Of its downward portions 36 and 36a, only 36a, which is in the positive section of the waveform of FIG. 10b', is selected as a pulse, as in FIG. 10h. Furthermore, No. 2 pulse train, as FIG. 10g, on the line 85 is given a total delay of about 30 microseconds, owing to a delay of exactly 10 microseconds possessed by the square wave, as in FIG. 10f, which controls the gate circuit 44, a deviation of exactly 10 microseconds between the counted value and the indicated value on the counter circuit 45, and some delay in the operation of the counter circuit 45. Consequently, in order to adjust the distance between No. 2 pulse train of FIG. 10g and the pulse train of FIG. 10h, the output pulse, as FIG. 10h, of the gate circuit 86 is given a delay of 30 microseconds, as in FIG. 10i, by means of the delay circuit 87 and thereby a No. 1 pulse train is produced, which together with No. 2 pulse train is let to the pedestal producing circuit 88 and this is triggered, thereby producing the master and slave pedestal waveforms 89 and 90, as shown in FIG. 10j.

Figure 13:
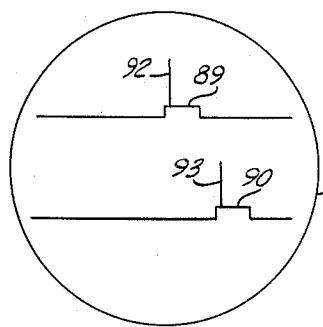
FIG. 13 is a diagram showing the figure indicated on the cathode-ray tube.

The master and slave loran pulses 92 and 93 as shown in FIG. 10k which are received by the radio receiver 91 (FIG. 7), the output of the frequency divider as shown in FIG. 10a, the fundamental square wave such as shown by FIG. 10b', and each of the pedestal waveforms 89 and 90 are fed to the cathode-ray tube indicator 94. As a result, a figure such as shown in FIG. 13, for example, is displayed on the cathode-ray tube image screen 95. In this way, the phase difference between the master and slave loran pulses can be obtained by the value indicated on the indicator circuit 46 at the time when each loran pulse coincides at the position 100 microseconds from the starting point of each pedestal waveform as shown in FIG. 10j, together with the indicated value of the rotational angle of the variable phase shifter 66.

Such synchronization of each pedestal waveform with each loran pulse is operated in the following manner. No. 1 pulse train, which is the ouput of the delay circuit 87 (FIG. 7), is delayed exactly 100 microseconds by means of the delay circuit 96 and together with the loran pulse which is being sent from the radio receiver 91 is fed to the anticoincidence circuit 97. The anticoincidence circuit 97 does not produce an output when the output of the delay circuit 96 and the master loran pulse 92 arrive simultaneously. But, when the output of the delay circuit 96 arrives separately from the master loran pulse, it will pass this to the control circuit 98, and then the control circuit 98 amplifies this and sends it to the movable piece of the switch 99. The switch 99 has two contact points 99a and 99b, and when the movable piece is in contact with contact point 99a, the control signal closes the gate circuit 100 and cuts off only one pulse of the pulse train which is being sent form the frequency divider 22 to the frequency divider 23. Consequently, the period of No. 1 pulse train is lengthened by one period of the pulse being cut off; then the master pedestal 89 stops on the cathode-ray tube indicator screen 95 (FIG. 13) and the master loran pulse 92 is in a state to move from right to left. Again, when the loran pulse 92 and the pedestal 89 are synchronized in the manner described above, the movement of the loran pulse stops. Also, when the movable piece of the switch 99 is in contact with the contact point 99b, the control signal is mixed with the pulse train which is being sent from the frequency divider 22 and is sent to the frequency divider 23; and the period of No. 1 pulse train is shortened by one period of the output wave of the frequency divider 22. Consequently when the master pedestal pulse 89 stops on the cathode-ray tube indicator screen 95 and the master loran pulse 92 is in a condition to move from left to right and when the loran pulse 92 and the pedestal pulse 89 are synchronized in the relation described above, movement of the loran pulse is arrested.

Also, No. 2 pulse train, as shown in FIG. 10g, on the line 85 is delayed exactly 100 microseconds by means of the delay circuit 101 and, together with the slave loran pulse 93, is led to the anticoincidence circuit 102. The anticoincidence circuit 102 does not produce an output when the output of the delay circuit 101 and the slave loran pulse 93 arrive simultaneously. But, when the output of the delay circuit arrives separtely from the slave loran pulse 93, (FIG. 10k), it passes this to the switching circuit 103.

Figure 14:
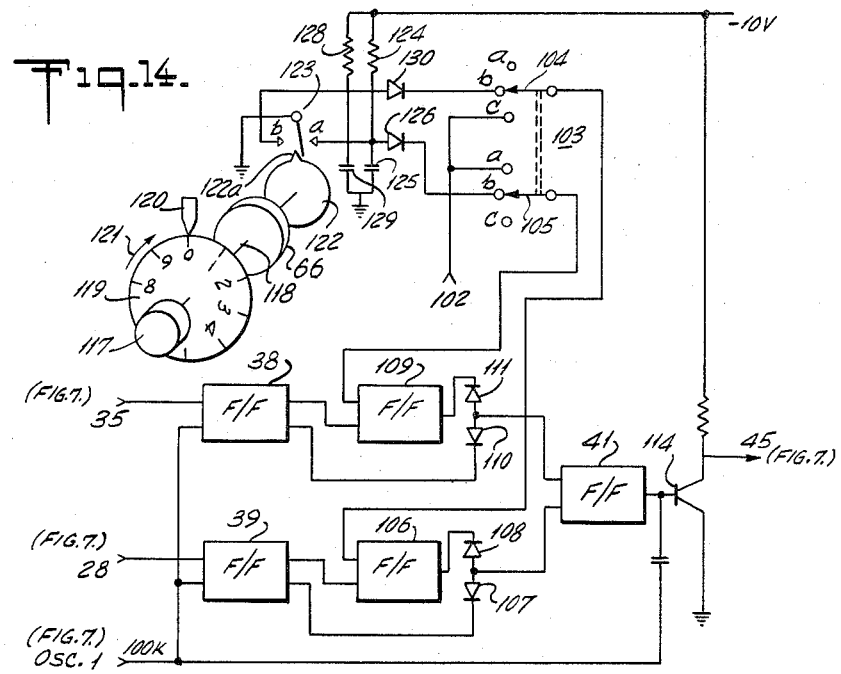
FIG. 14 is a diagram showing the relation between the variable phase shifter and the slave loran pulse synchronization adjustment part, and the gate circuit for the high-frequency wave to be counted.

As shown in FIG. 14, the switching circuit 103 has two interlocked switches 104 and 105, each has one movable arm and three contact points a, b, and c. The output of the anticoincidence circuit 102 of FIG. 7 is fed to the contact point c of the switch 104 and the contact point a of the switch 105. The movable arm of the switch 104 together with the output side of the flip-flop circuit 39 is connected to the input side of the flip-flop circuit 106; the outputs of the flip-flop circuits 39 and 106 are synethesized via the rectifiers 107 and 108, and then it is fed to the flip-flop circuit 41. The movable arm of the switch 105 together with the output side of the flip-flop circuit 38 is connected to the input side of the flip-flop circuit 109; the outputs of the flip-flop circuits 38 and 109 are synthesized via the rectifiers 110 and 111 and then it is connected to the input side of the flip-flop circuit 41.

When the slave pedestal 90 is not in a state of synchronism as in FIG. 13 with the slave loran pulse 93, assume that the switches 104 and 105 are put on the side of the contact point a; then, the flip-flop circuit 109 is switched by the pulse, such as FIG. 10l, which is fed from the anticoincidence circuit 102 via the switch 105. Next it is restored by the rise time portion 112 of the output short square wave, such as shown in FIG. 10d, of the flip-flop circuit 38 and thereby a square wave, such as FIG. 10m, is produced. The flip-flop circuit 41 is switched by the downward portion 113 of the aforesaid square wave. It is not subject to the influence of the subsequently arriving downward portion 42 of the output short square wave of the flip-flop circuit 38. It is however restored by the downward portion 43 of the output short square wave of the flip-flop circuit 39. As a result, a square wave, such as FIG. 10n, which continues exactly for 10010 microseconds is produced. The gate circuit 44 is subject to the control of the above square wave.

The gate circuit 44 of FIG. 7 consists of a transistor 114 shown in FIG. 14. The square wave, such as FIG. 10n, and the high-frequency wave of 100 kc. from the oscillator 1 are fed to its base; hence, 1001 pieces of 100 kc. high-frequency pulses appear on its collector during the period of continuation of the above square wave. When the counter circuit 45 of FIG. 7 has counted 1001 pieces of pulses, the value indicated on the indicator 46 is decreased by <1> compared with that before the counting was started. As a result, the position of the output pulse of the counter circut 45, as shown in FIG. 10g, advances 10 microseconds during each counting operation and the slave pedestal 90 moves from right to left on the cathode-ray tube indicator screen 95.

Again, assume that the switches 104 and 105 are put on the side of the contact point c at the time when the slave pedestal is not in synchronism with slave loran pulse 93; then, the flip-flop circuit 106 is switched by a pulse, such as FIG. 10l, which is fed from the anticoincidence circuit 102 via the switch 104, and next it is restored by the upward portion 115 of the output short square wave, such as shown in FIG. 10e, of the flip-flop circuit 39 and thereby a square wave, such as FIG. 10o, is produced. The flip-flop circuit 41 is switched by the downward portion 42 of the output square wave of the flip-flop 38, and is restored by the downward portion 116 of the output square wave of the aforesaid flip-flop circuit 106. Since it is not subject to the influence of the subsequently arriving downward portion 43 of the output square wave pulse of the flip-flop circuit 39, a square wave, such as FIG. 10p, which continues exactly for 9990 microseconds is produced and the gate circuit 44 is controlled by the aforesaid square wave. Consequently, 999 pieces of high-frequency pulses are fed to the counter circuit 45 and counting is operated accordingly; thus, the value indicated on the indicator circuit 44 is decreased by<1> compared with that before the counting operation was started. As a result, the position of the output pulse, as shown in FIG. 10g, of the counter circuit 45, moves back by 10 microseconds for each time of the counting operation and the slave pedestal 90 moves from left to right on the cathode ray indicator screen 95.

Such movement of the slave pedestal on the cathode-ray tube indicator is to be carried out in the direction approaching the slave loran pulse. For selecting this direction of movement, the switches 104 and 105 are pulled down onto either of contact point a or contact point c.

As a result of the movement of the slave pedestal described above, when it is nearly synchronized with the slave loran pulse in a relation shown in FIG. 13, then the anticoincidence circuit 102 does not produce an output so that the flip-flop circuit 106 or 109 ceases to be operative; consequently, the output of the flip-flop circuit 41 becomes a square wave having a width of 10 milliseconds, as shown in FIG. 10f, and the counter circuit 45 counts 1000 pieces of pulses each time; hence, the value indicated on the indicator circuit 46 does not change each time and the slave pedestal stops in a state of approximate synchronism with the slave loran pulse. When the slave pedestal comes to maintain a state of synchronism in this way, the switches 104 and 105 are returned to the side of the contact point b.

When the slave pedestal is approximately synchronized with the slave loran pulse as described above, both being displayed in an enlarged form on the cathode-ray tube indicator screen, the variable phase shifter 66 is varied by operating the handle 117, as shown in FIG. 14 to synchronize precisely the slave pedestal with the slave loran pulse. The phase difference of the master and slave loran pulses can then be read on the indicator circuit 46 and the indication corresponding to the indicator 120 on the scale 119 provided on the rotary shaft 118 of the variable phase shifter as shown in FIGURE 14.

Now, assume the handle 117 to be turned in the direction of arrow 121, then the numerical value indicated by the indicator on the scale 119 decreases gradually, and in response to this change the phase shift on the variable phase shifter 66 decreases gradually and the slave pedestal on the cathode-ray tube indicator screen moves from right to left little by little. And, when the indication on the scale 119 decreases below zero, the projection 122a of the cam 122 provided in the rotary shaft 118 pushes the switch 123 to the right and thereby brings its movable arm in contact with the contact point a. As a result, the charge on the condenser 125, which has been charged through the resistor 124, is discharged through the switch 123, and the impulse, such as FIG. 10q, produced at this time actuates the flip-flop circuit 109, via rectifier 126 and the switch 105. The flip-flop circuit 109 is restored by the upward portion 112 of the short square wave, such as shown in FIG. 10d, which is sent from the flip-flop circuit 38, and thereby a square wave, such as FIG. 10r, is produced. The flip-flop circuit 41 is switched by the downward portion 127 of the above square wave and is restored by the downward portion 43 of the output short square wave of the flip-flop circuit 39; therefore, the gate circuit 44 is opened for a time of 10010 microseconds, as shown in FIG. 10n. Consequently, 1001 pieces of high-frequency pulses are fed to the counter circuit 45 and counting is operated accordingly so that the indicated value on the indicator circuit 46 decreases by "1." By this, even when the phase shift of the variable phase shifter is varied below zero, the indicator circuit 46 can indicate a correct value at all times.

Again, when the handle 117 (FIG. 14) is turned in the direction opposite to that of arrow 121, the value indicated on the scale 119 increases gradually, and as a result, the phase shift of the variable phase shifter increases gradually and the slave pedestal on the cathode-ray tube fluorescent screen moves from left to right. When the indication on the scale 119 increases beyond "10," the projection 122a of the cam 122 pushes the switch 123 to the left side and brings its movable arm into contact with the contact point b, whereupon, the charge of the condenser 129, which has been charged through the register 128, is discharged. The impulse produced by the discharge, as shown in FIG. 10q, switches the flip-flop circuit 106 via the rectifier 130 and the switch 104, and the aforesaid flip-flop circuit is restored by the upward portion 115 of a short square wave, such as FIG. 10e, which is sent from the flip-flop circuit 39, and thereby a square wave, such as FIG. 10s, is produced. The flip-flop circuit 41 is switched by the downward portion 42 of the output short square wave of the flip-flop circuit 38 and is restored by the downward portion 131 of the above square wave, such as shown by FIG. 10e; therefore, a square wave, such as FIG. 10p, opens the gate circuit 45 for 9990 microseconds. Consequently, 999 pieces of high-frequency pulses are fed to the counter 45 and are counted and thereby the value indicated on the indicator circuit 46 increases by "1." In this way, even though the phase shift of the variable phase shifter 66 increases beyond "10," the indicator circuit 46 can give correct value at all times.

What is claimed is:

1. Phase difference measuring apparatus comprising a relatively high frequency oscillator, a frequency divider connected with said oscillator and producing a first series of timing pulses at a relatively low repetition rate, a gate pulse generator connected with said frequency divider, said generator upon being actuated by said low frequency pulses producing timed gate control signals, a frequency pulse counter including means producing an output pulse each time the counter registers a predetermined number which occurs once each time the counter is cycled through its zero reading, a gate having an input connected to said oscillator and an output connected to said counter, and a connection between said generator and said gate whereby said generator upon periodic actuation by low frequency pulses opens said gate for predetermined time intervals shorter than the time intervals between said low frequency pulses to feed groups of oscillator pulses to said counter periodically to cycle the counter once through said predetermined number and produce a second series of timing pulses, the number of said oscillator pulses being limited to cause said counter to return after each cycle substantially to its starting position at the time said gate is closed, the numerical indication on said counter at the conclusion of each cycle being a measure of the time difference between the first and second series of pulses, and means adjusting the number of said oscillator pulses fed to said counter to shift the phase of said second series of timing pulses relative to said first series of timing pulses, the reading on said counter being automatically changed in accordance with said adjustment of the number of oscillator pulses fed to the counter.

2. Phase difference measuring apparatus according to claim 1 wherein said counter at the start of a cycle registers a selected number, said selected number is successively decreased by said high frequency pulses and said output signal is produced when said counter passes through its zero reading.

3. Phase difference measuring apparatus according to claim 1 including a square wave generator connected to the output of said counter and responsive to said second series of timing pulses to produce a series of unidirectional square wave pulses, a gate having an input and output, a connection between said gate and said square wave generator to open the last said gate for a time determined by the duration of each pulse, and means including a phase shifter having a time indicating scale connecting said oscillator to the input of the last said gate whereby the last said gate produces a third series of timing pulses the phase of which can be shifted throughout a time range corresponding to one cycle of said oscillator frequency, said first and third series of timing pulses being utilized for phase difference measurements with the measured phase difference being the algebraic sum of said counter reading and the reading on said time indicating scale.

4. Phase difference measuring apparatus comprising a high frequency oscillator, a plurality of series connected frequency dividers connected to said oscillator and producing a first, relatively low frequency pulse train, a gate pulse generator connected to said dividers and producing periodic signals in response to the pulses of said train with each of said signals continuing for a predetermined period, a gate having an input connected to said oscillator and an output, a connection between said gate and said gate pulse generator whereby said gate is opened for the duration of said periodic signals to pass said high frequency during the existence of said signal, a cumulative counter connected to said gate output and counting the high frequency pulses passing through said gate, the number of said pulses passing said gate each time it is opened being substantially equal to the capacity of the counter, said counter operating through a complete cycle during the period defined by said signal, means on said counter producing a pulse once each time the counter is cycled through its zero reading by said pulses, and switching means interconnected with said frequency dividers to modify the periodicity of said pulse train, the reading on said counter at the completion of each cycle being an indication of the time differences between each pulse of said pulse train and the resultant pulse produced by said counter.

5. Phase difference measuring apparatus according to claim 4 wherein said switching means is interconnected with each of said frequency dividers and is operable to feed back a signal from one divider to a preceding divider and to disconnect at least one divider from the series.

6. Phase difference measuring apparatus according to claim 5 wherein said switching means provides first pulse train periodicities of approximately 30 milliseconds, 40 milliseconds and 50 milliseconds and means connected between said dividers and said gate generator and producing pulses of 10 milliseconds duration each of which terminate midway between successive pulses of the first said train.

7. Phase difference measuring apparatus according to claim 5 wherein said switching means provides pulse train periodicities of approximately 30 milliseconds, 40 milliseconds and 50 milliseconds and means connected between said dividers and said gate generator and producing pulses of 10 millisecond duration each of which terminate at a time coincident with a pulse of the first said train.

8. Phase difference measuring apparatus comprising means for producing a first pulse train having a comparatively low frequency, means responsive to the pulses of said first train and generating a gate control pulse which continues for a predetermined period, an oscillator producing a comparatively high and stable frequency, a first gate connected to said oscillator and to said gate control pulse generator, said first gate passing said oscillator frequency during the existence of said gate control pulse, a counter connected to said gate and counting said high frequency pulses, the number of pulses of said oscillator frequency being substantially equal to the capacity of the counter, said high frequency pulses cycling the counter through zero each time said gate is operated, said counter decreasing its count by one (1) each time a high frequency pulse is detected by the counter and producing a pulse after the counter has recorded a number of pulses of said oscillator frequency corresponding to the numerical value indicated by said counter at the time the aforesaid gate is actuated by said gate control pulse, a variable phase shifter connected to said oscillator, a second gate connected to said variable phase shifter, a connection between said second gate and said counter, said second gate being actuated by the pulse produced by said counter to pass said oscillator frequency for a preselected period, counter pulse shaping means connecting said second gate with said counter to transform said counter pulses to square wave pulses each having a duration corresponding to one cycle of said oscillator frequency and phase shifting means interconnected with said first gate to increase the reading on said counter at the conclusion of each cycling operation when the last said phase shifter is operated in one direction and to lower the reading on said counter at the conclusion of each cycling operation when the phase shifter is operated in the other direction.

9. Phase difference measuring apparatus according to claim 8 wherein said counter modifying means for decreasing the counter indication includes a cam and cooperating switch actuated by said variable phase shifter when the latter is operated in one direction, said cam and switch further operating to advance the counter indication when the phase shifter is operated in the other direction.

10. Phase difference measuring apparatus for producing first and second low frequency pulse trains adjustable in phase one relative to the other, said pulse trains upon being synchronized with a second pair of pulse trains of unknown phase difference affording a determination of the phase difference between said second pair of pulse trains, said apparatus comprising a high frequency power source having a stable frequency, gating means connected to said source, means controlling said gating means to repetitively permit said stable frequency to pass therethrough for intervals of predetermined duration, electronic mounting means connected to said gate and counting the number of stable frequency pulses passing said gate during each interval, means connected with said high frequency stable power source to produce a first low frequency pulse train, a connection between the last said means and said controlling means whereby the pulses of said first train trigger said gate to start each interval of transmission, said intervals each having a duration that will permit a sufficient number of pulses from said power source to cycle the counter from a given reading backwardly through zero, means on said counter producing an output pulse each time the counter passes through zero, said output pulses forming a second low frequency pulse train and means connecting the counter and said gate for adjusting the number of the pulses fed to said counter to shift the phase of said second pulse train relative to the first said pulse train, the reading on said counter at the conclusion of each cycle being an indication of the phase difference between the first and second low frequency pulse trains.

References Cited by the Examiner
UNITED STATES PATENTS

| | | | |
|---|---|---|---|
| 2,405,597 | 8/1946 | Miller. | |
| 2,574,494 | 11/1951 | Palmer | 324—85 X |
| 2,578,980 | 12/1951 | O'Brien | 343—103 |
| 2,752,593 | 6/1956 | Downs | 324—68 X |
| 2,835,888 | 5/1958 | Frank | 343—103 |
| 2,851,596 | 9/1958 | Hilton. | |
| 2,877,416 | 3/1959 | Grisdale | 324—83 |
| 2,918,625 | 12/1959 | Houghton et al. | 324—83 |
| 2,948,856 | 8/1960 | Tanaka | 324—83 X |
| 2,991,354 | 7/1961 | Crafts | 324—133 X |

WALTER L. CARLSON, *Primary Examiner.*